US005589286A

United States Patent [19]
Iwata

[11] Patent Number: 5,589,286
[45] Date of Patent: Dec. 31, 1996

[54] SOLID ELECTROLYTE FUEL CELL

[75] Inventor: Tomoo Iwata, Kawasaki, Japan

[73] Assignee: Fuji Electric Co., Ltd., Kanagawa, Japan

[21] Appl. No.: 278,070

[22] Filed: Jul. 20, 1994

[30] Foreign Application Priority Data

Jul. 21, 1993 [JP] Japan .................................. 5-179486

[51] Int. Cl.⁶ .............................. H01M 8/24; H01M 8/12
[52] U.S. Cl. .................. 429/34; 429/30; 429/32; 429/38
[58] Field of Search ............................. 429/30, 32, 33, 429/34, 38, 39

[56] References Cited

U.S. PATENT DOCUMENTS

| 4,395,468 | 7/1983 | Isenberg . | |
|---|---|---|---|
| 4,490,444 | 12/1984 | Isenberg . | |
| 4,874,678 | 10/1989 | Reichner | 429/32 |
| 5,175,063 | 12/1992 | Ishihara et al. | 429/32 |
| 5,200,279 | 4/1993 | Draper et al. . | |
| 5,292,599 | 3/1994 | Soma et al. | 429/30 |

FOREIGN PATENT DOCUMENTS

| 57-113561 | 7/1982 | Japan . |
|---|---|---|
| 57-130381 | 8/1982 | Japan . |
| 1-169878 | 7/1989 | Japan . |
| 3-276564 | 12/1991 | Japan . |
| 4-75262 | 3/1992 | Japan . |

Primary Examiner—Prince Willis, Jr.
Assistant Examiner—Carol Chaney
Attorney, Agent, or Firm—Spencer & Frank

[57] ABSTRACT

The present invention provides a planar solid electrolyte fuel cell which includes a stack casing having a stack reaction chamber therein. A plurality of electrode/solid electrolyte/separator assemblies are arranged in parallel in the stack reaction chamber of the stack casing. Each of the plurality of assemblies have a cell substrate serving as a first electrode, a solid electrolyte provided on a main surface of the cell substrate, a second electrode provided on the solid electrolyte, and a separator provided on an opposite main surface of the cell substrate. The cell substrate is a flat box in which a plurality of reaction gas flow ports are formed in parallel to the main surface thereof. The gas flow ports feed a first reactant gas in a uniform direction, and an electro-conductive felt is interposed between the assemblies.

37 Claims, 8 Drawing Sheets

SOLID ELECTROLYTE FUEL CELL

BACKGROUND OF THE INVENTION

1. Field of the Invention

The present invention relates to a solid electrolyte fuel cell and more particularly to its cell structure, i.e., electrode/solid electrolyte/separator assembly and a supporting structure therefor.

2. Description of the Related Art

Solid electrolyte fuel cells use zirconia as the electrolyte and operate at high temperatures near 1,000° C. and, hence, high efficient, high power generation is expected to occur and no reforming of raw fuel nor maintenance of the electrolyte is required. The exhaust gas from the fuel cells is at a high temperature so that exhaust heat can be used for various purposes.

Recently, research and development of solid electrolyte fuel cells have increased. From their structure, solid electrolyte fuel cells are divided into two groups, i.e., cylindrical and planar ones. Ceramics are used as a major material in the both types of the fuel cells.

Figure 1A:
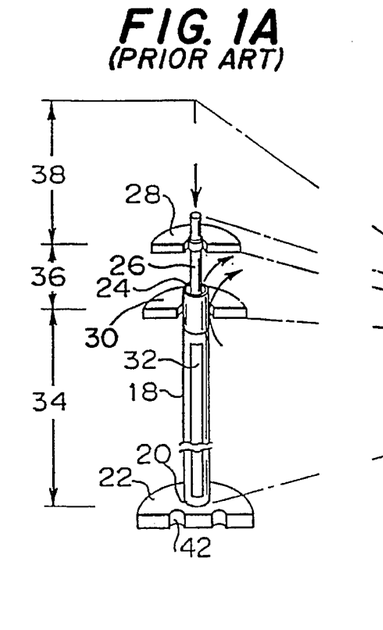
FIG. 1A is an enlarged view showing a main part of a conventional cylindrical solid electrolyte fuel cell.
Figure 1B:
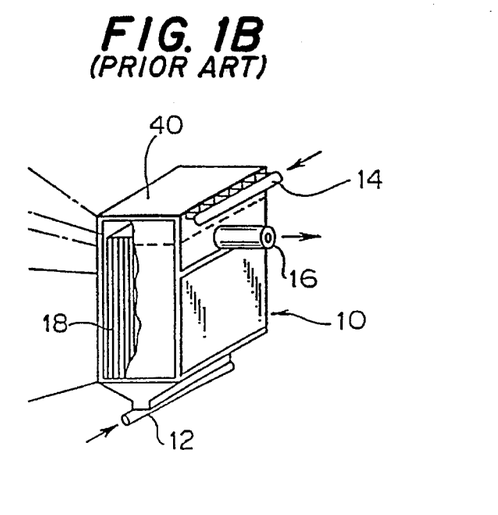
FIG. 1B is a perspective view showing a module including the main part of the conventional cylindrical solid electrolyte fuel cell shown in FIG. 1A.

FIG. 1A is an enlarged view which shows a main part of a conventional cylindrical solid electrolyte fuel cell, and FIG. 1B is a perspective view which shows a module including the main part of the conventional cylindrical solid electrolyte fuel cell. In FIGS. 1A and 1B, a gas-tight housing 10, which is provided with a fuel gas supply manifold 12, an oxidant gas supply manifold 14, and an exhaust gas conduit 16, contains a plurality of annular or tubular fuel cells 18. One of the tubular fuel cells 18 is illustrated in FIG. 1A. The fuel cell 18 has a closed end 20 facing an end wall 22 of the housing 10, and an open end 24 opposite to the closed end 20. An air conduit 26 having an opening (not shown) at its lower end is inserted in the cavity of the tubular fuel cell 18 through the open end 24 thereof. The air conduit 26 is supported on a tube sheet 28 and the fuel cell 18 is supported on a porous barrier 30. Each fuel cell 18 has one or more interconnectors 32 through which the plurality of fuel cells are electrically interconnected to each other. A fuel inlet or generating chamber 34 extends between the end wall 22 of the housing 10 and the porous barrier 30. A preheating chamber 36 extends between the porous barrier 30 and the tube sheet 28. An air inlet chamber 38 extends between the tube sheet 28 and an upper wall 40 of the housing 10 and the tube sheet 28. The tube sheet 28 and the porous barrier 30 need not be gas-sealed. Fuel gas and oxidant gas, e.g., air, are supplied into the fuel gas supply manifold 12 and the oxidant gas supply manifold 14, respectively. The air supplied from the air supply manifold 14 flows into the air inlet chamber 38 and then into the air conduit 20, flows out of the opening of the conduit 20, flows back in the cavity of the tubular fuel cell 18, and flows out of the open end 24 of the fuel cell into the preheating chamber 36. On the other hand, the fuel gas supplied from the fuel gas supply manifold 12 is introduced into the generating chamber 34 through fuel inlet ports 42 provided in the end wall 22 of the housing 10 and unreacted fuel flows through the porous barrier and a gap between the porous barrier and the fuel cell. Excess air and unreacted fuel gas are exhausted from the exhaust gas conduit 16.

The apparatus shown in FIGS. 1A and 1B substantially corresponds to the solid electrolyte fuel cell described in Japanese Patent Application Laying-open No. 113561/1982 corresponding to U.S. Pat. No. 4,395,468 to Isenberg, assigned to Westinghouse Electric Corporation (cf., especially FIGS. 1 and 3). The fuel cell is considered to be a model which would be closest to a practically acceptable one. The major feature of the above-mentioned conventional fuel cell is that in principle, it allows a free thermal expansion and needs no gas seal.

Figure 1C:
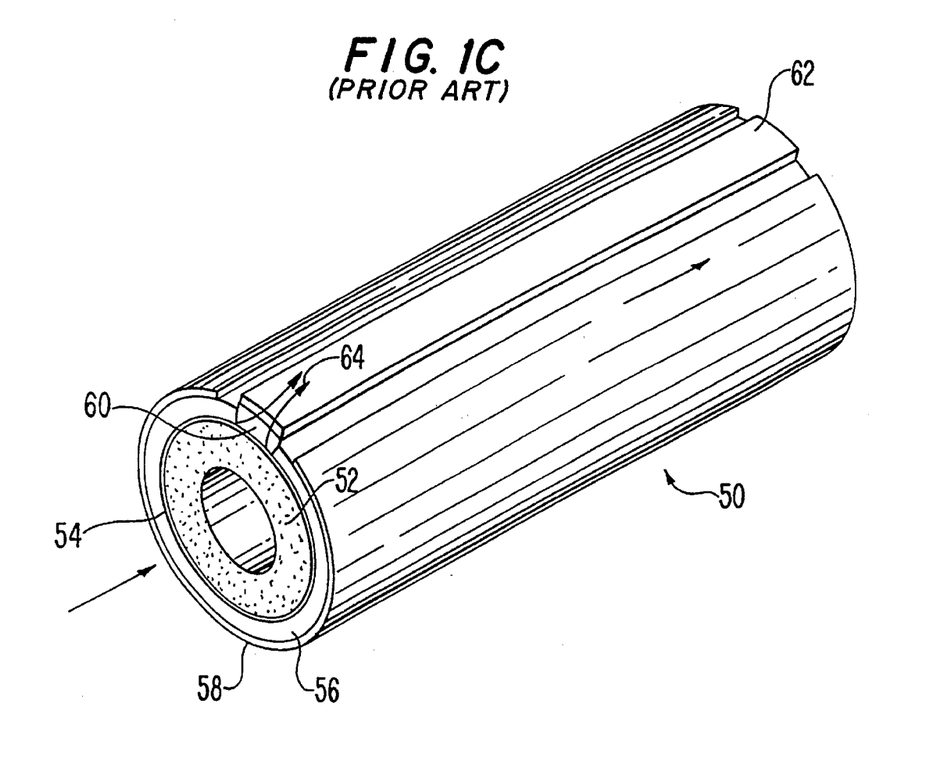
FIG. 1C is a perspective view showing another conventional annular solid electrolyte fuel cell.

FIG. 1C is a perspective view showing another conventional annular solid electrolyte fuel cell. In FIG. 1C, an annular fuel cell 50 includes a porous support tube 52 which is comprised of calcia stabilized zirconia forming a porous wall. A thin film porous air electrode, or cathode 54 surrounds the outer periphery of the porous support tube 52. The cathode 54 is comprised of $LaMnO_3$. A layer of gas-tight solid electrolyte 56, which is comprised of 8 mole % yttria-stabilized zirconia, surrounds the cathode 54. A substantial part of the solid electrolyte 56 is surrounded by a porous anode 58 comprised of Ni-zirconia cermet. An interconnector 60, which is comprised of $LaCrO3$, is provided on a selected part of the solid electrolyte 56. Further, a cell interconnection part 62, which is comprised of an Ni felt, is provided on the interconnector 60 to connect the fuel cell with a similar adjacent fuel cell. In the fuel cell arrangement shown in FIG. 1C, during operation, air flows through the center of the annular cell 50 and fuel gas such as hydrogen gas ($H_2$) passes over the exterior. Oxygen from air diffuses through the porous support 52 and cathode 54, and fuel gas diffuses through the anode 58. The reactant gases react through the solid electrolyte 56, generating products such as water vapor, carbon dioxide, heat and electrical energy. Current flows from the outer anode 58 to the cathode 54 and then to the interconnection part 62 as indicated by arrows 64. That is, current flows in a circumferential direction or along the surface of the thin electrode 54. As a result, the above-described fuel cell has a defect that resistance loss in the electrode 54 is more than negligible so that the output density of the fuel cell is decreased. The above-described fuel cell substantially corresponds to the fuel cell solid electrolyte fuel cell configuration described in U.S. Pat. 4,490,444 (Isenberg, assigned to Westinghouse Electric Corporation) corresponding to Japanese Patent Application Laying-open No. 130381/1982.

Figure 2:
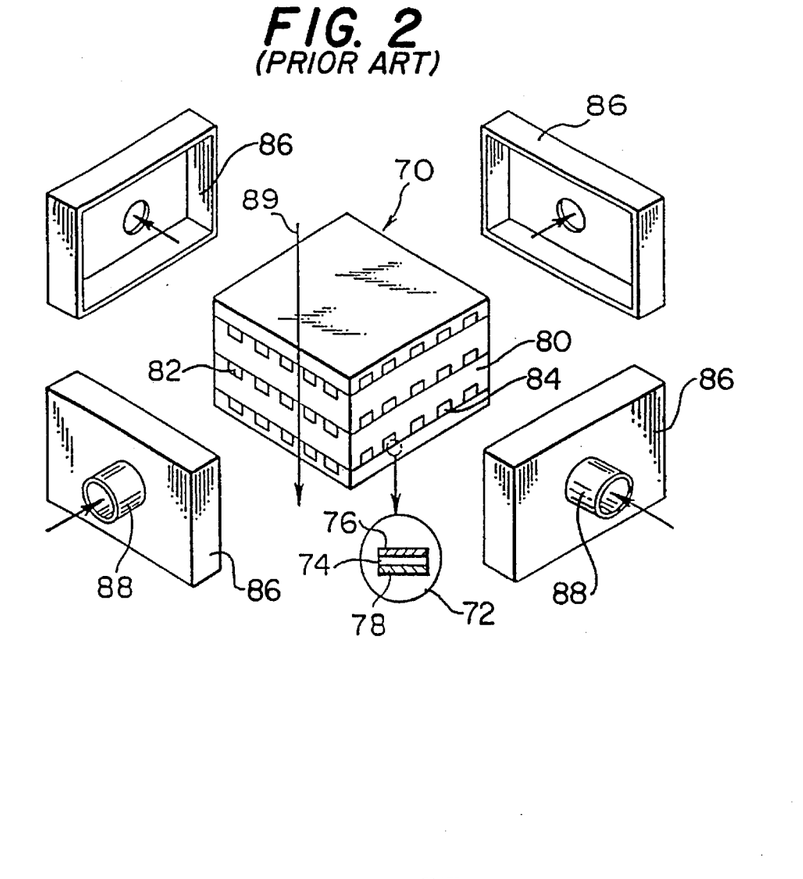
FIG. 2 is an exploded perspective view showing a conventional planar solid electrolyte fuel cell.

FIG. 2 is an exploded perspective view which shows a conventional planar solid electrolyte fuel cell. In FIG. 2, reference numeral 70 designates an assembly of a single cell 72 comprised of a plate of solid electrolyte 74 and electrodes 76 and 78, and a separator plate 80, the single cell 72 and the separator plate 80 being alternately superimposed one on another. The separator plate 80 is provided with a plurality of parallel grooves 82 on one main surface thereof and another plurality of parallel grooves 84 on the opposite surface thereof. The grooves 82 and 84 are arranged at right angles. Manifolds 86 are attached to respective side surfaces of the assembly 70. The manifolds are provided with conduits 88, respectively, through which reactant gases are introduced. The different reactant gases flow through the grooves 82 and 84, respectively. In the planar fuel cell arrangement shown in FIG. 2, current flows through the cell in a direction perpendicular to the surface of the cell as indicated by an arrow 89 so that it is in principle possible to reduce the flow path length of current as compared with the annular fuel cell described above. As a result, it can be expected that the planar fuel cell has a resistance loss smaller than that of the tubular fuel cell and, hence, an output density higher than that of the tubular fuel cell. However, since the planar solid electrolyte fuel cell is generally constructed such that the fuel cell and the separator plate are alternately superposed one on another in a direction of gravitation and in addition manifolds are attached on the sides of the resulting assembly, the fuel cells and the separators tend to suffer from damages due to stress by their weight as well as thermal stress. Furthermore, it is very difficult to achieve a gas seal between the cells and the separator plates, between the manifolds and the cells, and between the manifolds and the separator plates. The above-described conventional planar solid electrolyte fuel cell substantially corresponds to the solid electrolyte fuel cell disclosed in Japanese Patent Application Laying-open No. 75262/1992 (cf. especially FIG. 5 of the publication). In FIG. 2 of the present application, manifolds are additionally illustrated for better understanding.

Figure 3:
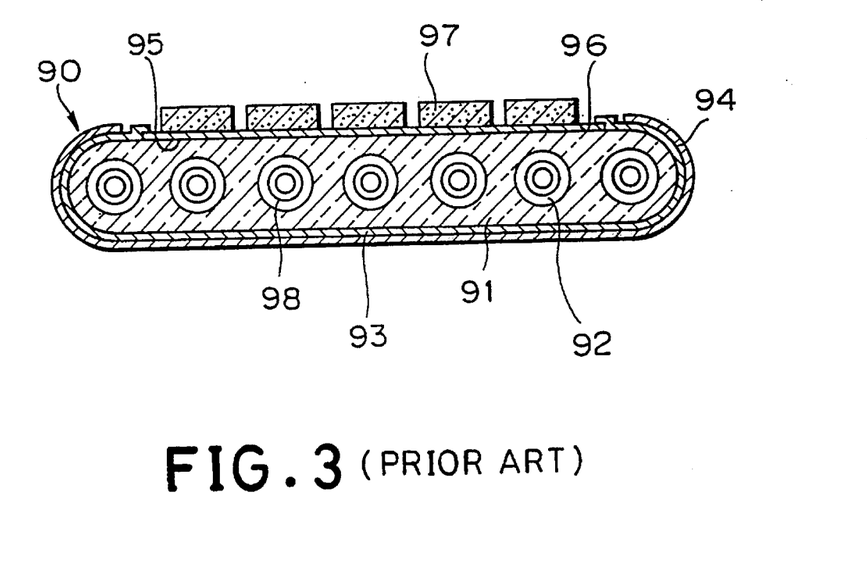
FIG. 3 is a cross sectional view showing another conventional planar solid electrolyte fuel cell.
Figure 4:
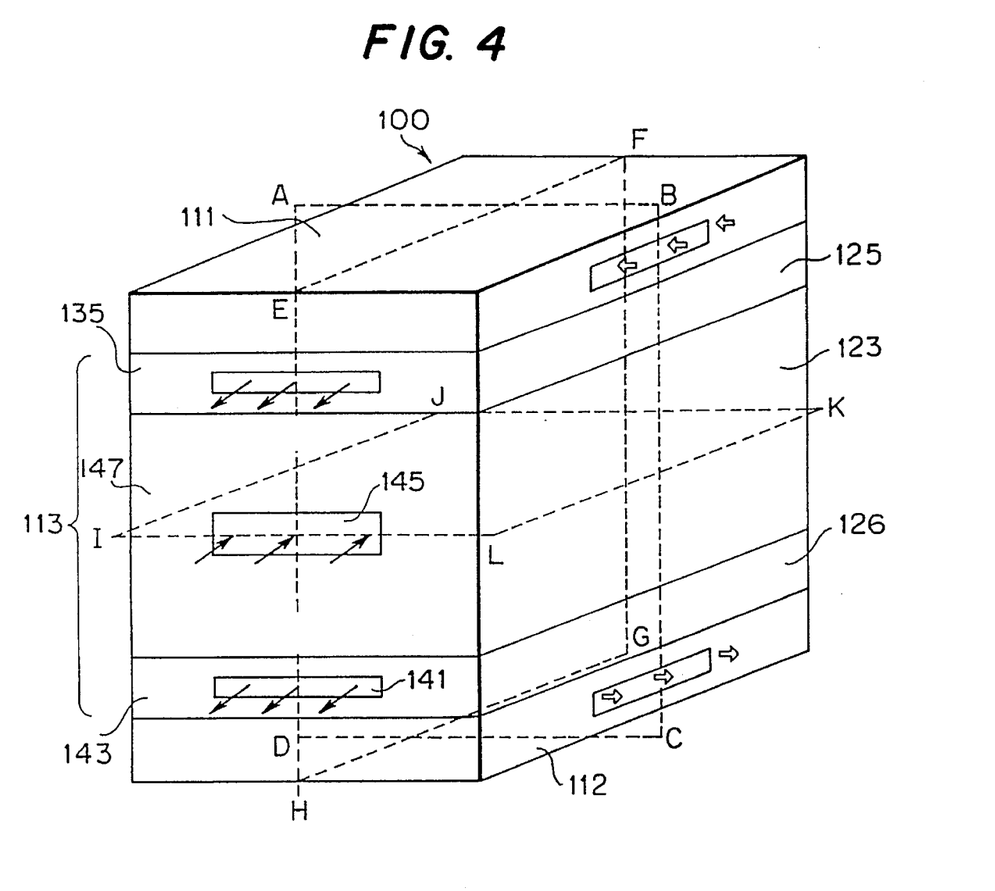
FIG. 4 is a schematic perspective view of a module of a solid electrolyte fuel cell according to an embodiment of the present invention.

FIG. 3 is a cross sectional view which shows another conventional planar solid electrolyte fuel cell as disclosed in U.S. Pat. No. 4,874,678 (Reichner, assigned to Westinghouse Electric Corporation) corresponding to Japanese Patent Application Laying-open No. 169878/1989. As shown in FIG. 3, a solid oxide electrolyte electrochemical cell stack configuration comprises a plurality of flattened, elongated, connected cell combinations 90. Each cell combination contains an interior electrode or air electrode 91. The air electrode 91, which serves as a substrate, is comprised of a flattened, elongated porous material having a top surface and a plurality of interior gas feed conduits or chambers 92, through its axial length, with electrolyte 93 contacting the interior electrode 91, and exterior electrode 94 contacting the electrolyte. A major portion of the air electrode top surface 95 is covered by an interconnection material 96. Further, each cell has at least one axially elongated, electronically conductive, flexible, porous, metal fiber felt material 97 in electronic connection with the air electrode 91 through contact with a major portion of the interconnection material 96. The interior gas feed chamber 92 is closed at one end, and a gas feed tube 98 is inserted in the chamber 92. Oxygen gas (one of the reactant gases) fed through the gas feed tube 98 passes through the space between the outer surface of the feed pipe and the surface of the interior gas feed chamber 92 along the cell length to exhaust at the open end of the chamber. Fuel gas flows along the outside surface of the electrochemical cell combination. The electrochemical cell combinations are electrically connected through the metal fiber felt strip 97. Thermal stresses generated in the cell combinations due to changes in temperature are alleviated by the above-described arrangement which allows free expansion and contraction. In the air electrode 91, current flows in a direction perpendicular to the top surface thereof. However, the conventional electrochemical cell combination configuration described above has disadvantages, such as the current flow path in the electrochemical cell combination cannot be reduced since the gas feed pipes are located within the gas feed chambers so that the inner resistance of the cell increases thus lowering the output density of the cell.

SUMMARY OF THE INVENTION

An object of the present invention is to obviate the disadvantages of the conventional fuel cells and provide a solid electrolyte fuel cell including a fuel cell combination which can expand or contract freely, in which a current flow path is relatively short so that internal resistance is relatively small, which and has a relatively high output density and an improved thermal stability.

According to the present invention, there is provided a planar solid electrolyte fuel cell which comprises: a stack casing having a stack reaction chamber therein; a plurality of electrode/solid electrolyte/separator assemblies arranged in parallel in the stack reaction chamber of the stack casing each of the assemblies comprising a cell substrate serving as a first electrode, a solid electrolyte provided on a main surface of the cell substrate, a second electrode provided on the solid electrolyte, and a separator provided on an opposite main surface of the cell substrate, the cell substrate being a flat box in which a plurality of reaction gas flow ports are formed in parallel to the main surface of thereof, the gas flow ports feeding a first reactant gas in a uniform direction; and an electroconductive felt interposed between the assemblies.

Here, the fuel cell may further comprise an inlet manifold provided on an outer surface of the stack casing for feeding a first reaction gas, and an outlet manifold provided on an opposite outer surface of the stack casing for exhausting the first reaction gas.

The stack casing may further comprise first and second buffer gas chambers sandwiching the stack reaction chamber therebetween and communicating with the fuel exhaust gas inlet and outlet manifolds, whereby buffer gas flows in the buffer gas chambers, the chambers being provided with slots through which the electrode/solid electrolyte/separator assemblies are inserted.

The buffer gas may be fuel exhaust gas.

The buffer gas may be steam.

The buffer gas may be at a pressure lower than the first and second reactant gases.

The buffer gas chambers may be made of a ceramic.

Each of the electrode/solid electrolyte/separator assemblies may hang on the stack casing.

The stack casing may consist of a heat-resistant metal, a ceramic or a composite material thereof.

The heat-resistant metal may be a ferrite stainless steel or Inconel 600.

The ceramic may be alumina or zirconia.

The cell substrate may be made of a lanthanum perovskite complex oxide.

The lanthanum perovskite complex oxide may be lanthanum manganite or lanthanum chromite.

The electroconductive felt may be nickel metal or cobalt metal.

The separator may be made of lanthanum chromite.

The electrode/solid electrolyte/separator assembly may further comprise a separate first electrode.

According to the present invention, the reaction gas flow ports formed in the flat stack casing, which serves as a cell substrate, penetrate the flat stack casing in parallel to each other. This configuration increases the flatness of the casing to thereby shorten the current flow path.

Further, the cell combinations can undergo free thermal expansion since the cell combinations are inserted in the stack casing, and the electroconductive felt is interposed between adjacent cell combinations. Reactant gas flows substantially in the same direction in a plurality of flow ports for the first reactant gas so that the temperature gradient in the cell substrate is small.

The above and other objects, effects, features and advantages of the present invention will become more apparent from the following description of embodiments thereof taken in conjunction with the accompanying drawings.

DESCRIPTION OF THE PREFERRED EMBODIMENT

Figure 5:
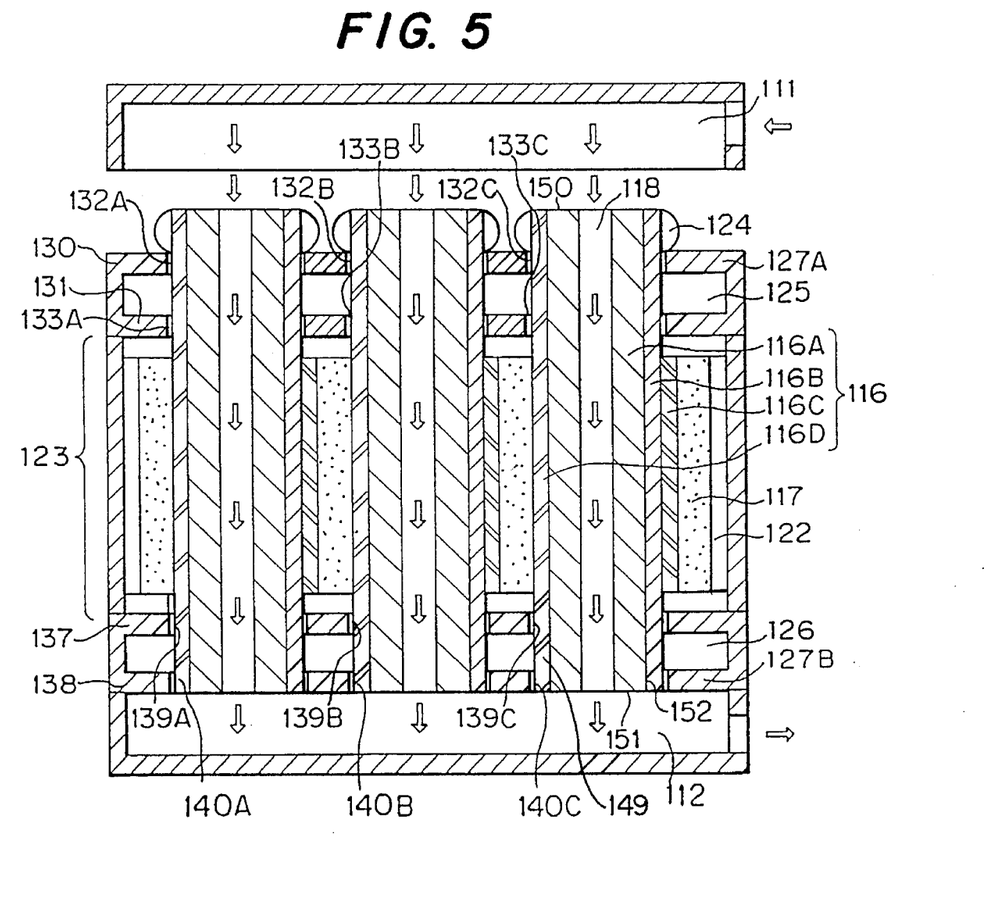
FIG. 5 is a cross sectional view taken along the plane ABCD of the module shown in FIG. 4.
Figure 6:
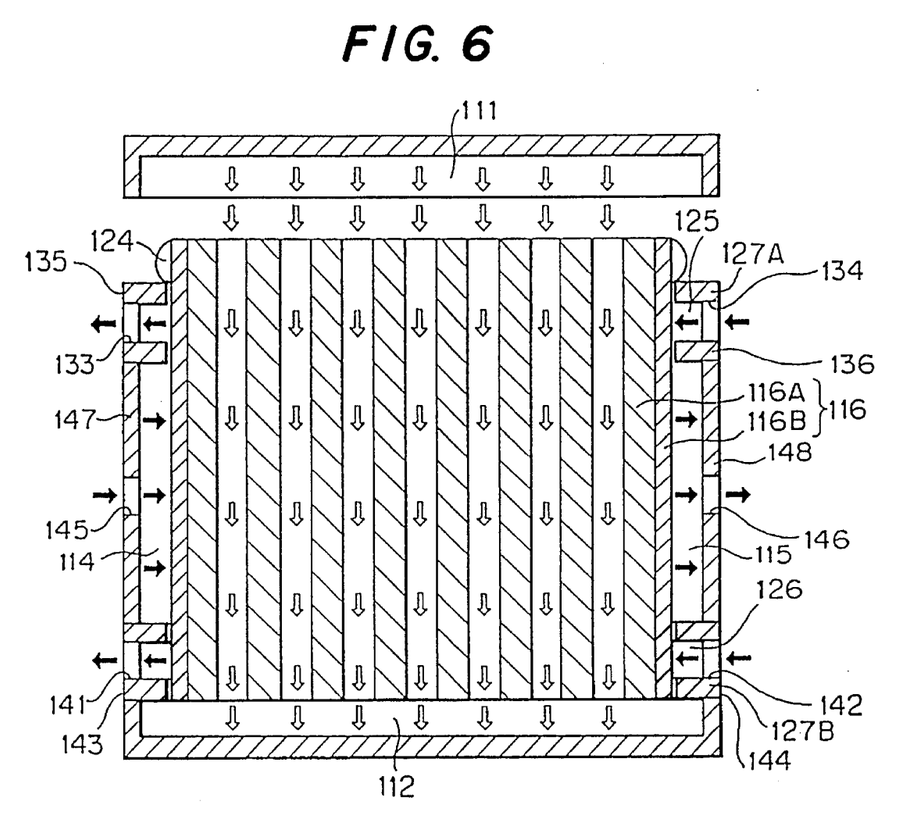
FIG. 6 is a cross sectional view taken along the plane EFGH of the module shown in FIG. 4.
Figure 7:
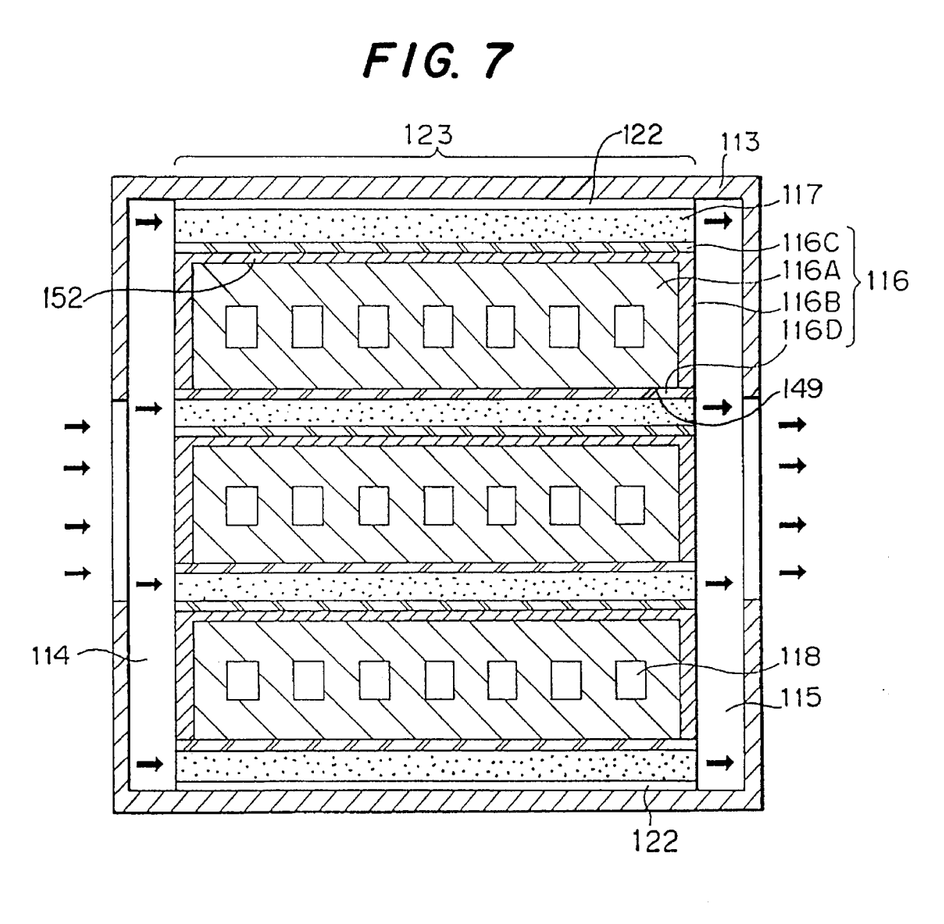
FIG. 7 is a cross sectional view taken along the plane IJKL of the module shown in FIG. 4.
Figure 8:
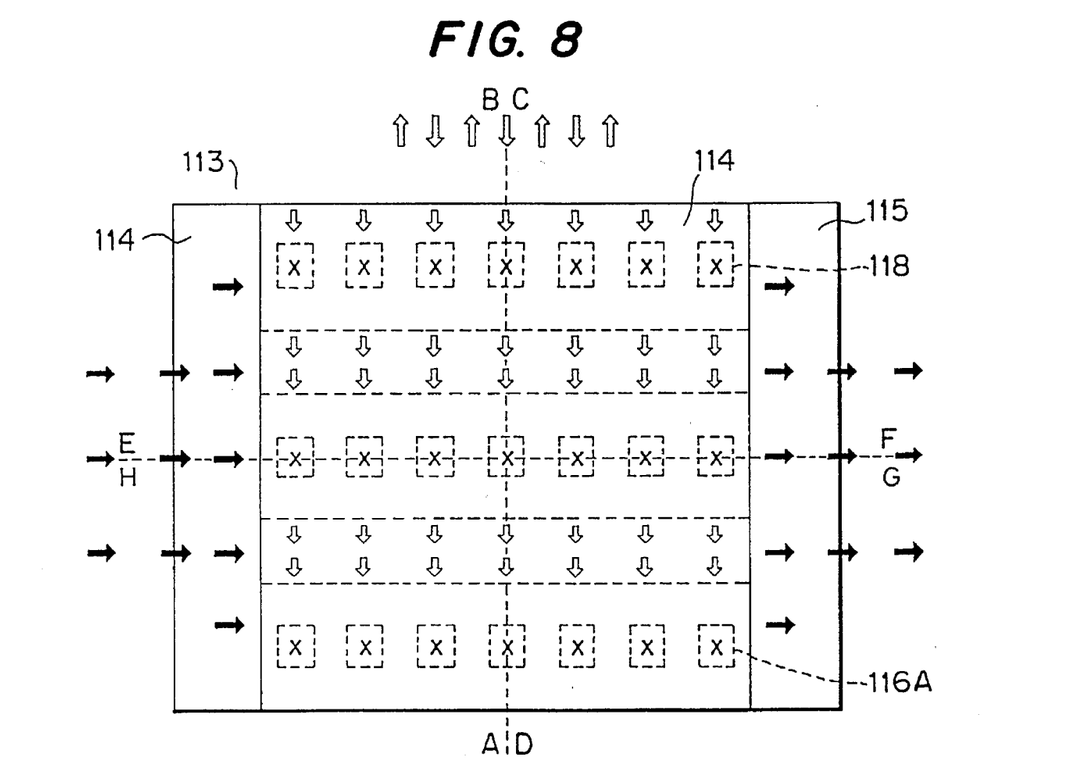
FIG. 8 is a schematic plan view showing the module shown in FIG. 4, illustrating the direction of flow of oxidant gas.
Figure 9:
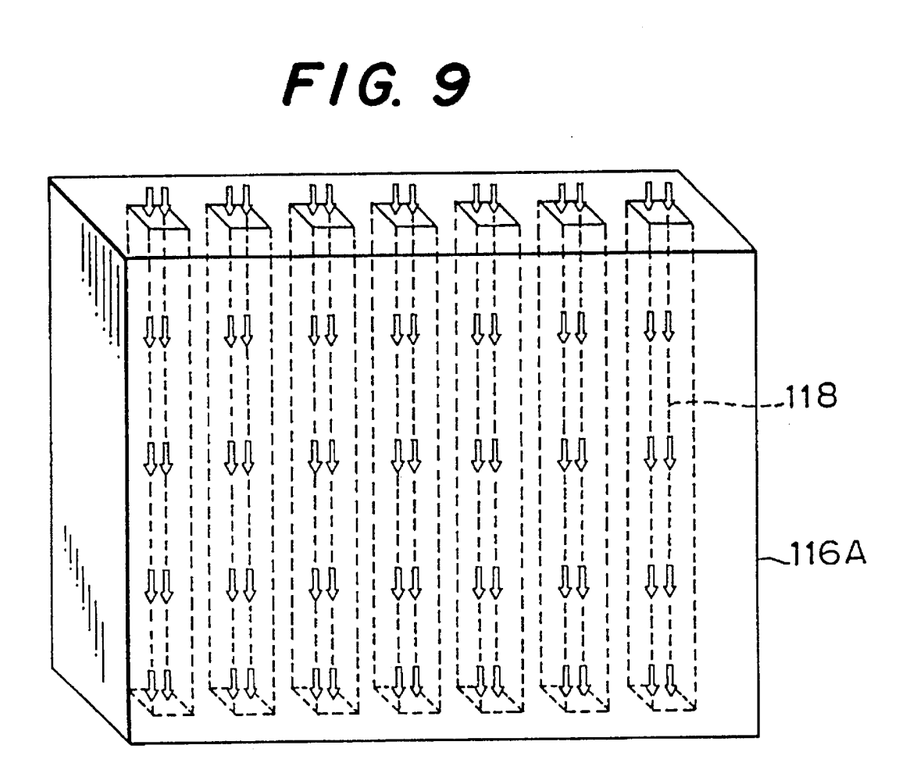
FIG. 9 is a schematic perspective view showing a cell substrate of the module shown in FIG. 4, illustrating direction of flow of oxidant gas in the cell substrate.

In FIGS. 4–9, a fuel cell module 100 includes an oxidant gas inlet manifold 111 for introducing an oxidant gas, an oxidant gas exhaust manifold 112 for exhausting oxidant gas, a stack casing 113, and an electrode/solid electrolyte/ separator assembly FIGS. 5–7 incorporated in the stack casing 113. The oxidant gas exhaust manifold 112, the stack casing 113, and the oxidant gas inlet manifold 111 are mounted one on another in this order. A fuel gas inlet manifold 115 (FIGS. 6–8) are and a fuel exhaust gas outlet manifold 115 are provided on outer surfaces of the stack casing 113 on front and back sides thereof.

The stack casing 113 has three chambers, i.e., a first buffer gas chamber 125, a stack reaction chamber 123, and a second buffer gas chamber 126. The first buffer gas chamber 125 is defined by an upper diaphragm 127A, which is a box having two parallel upper and lower plates or parts 130 and 131, respectively. The upper plate 130 is formed of three slots 132A, 132B and 132C in parallel in a longitudinal direction. The lower plate 131 is likewise formed of three slots 133A, 133B and 133C in parallel in a longitudinal direction and corresponding in size and form to the slots 132A, 132B and 132C, respectively, of the upper plate 130. The first buffer gas chamber 125 has a fuel exhaust gas outlet 133 and a fuel exhaust gas inlet 134. That is, the upper diaphragm 127A is formed of the fuel exhaust gas outlet 133 and the fuel exhaust gas inlet 134 in its front and back outer walls 135 and 136, respectively.

The second buffer gas chamber 126 is defined by a lower diaphragm 127B, which also is a box having two parallel upper and lower plates or parts 137 and 138, respectively. The upper plate 137 of the lower diaphragm is formed of three slots 139A, 139B and 139C in parallel in a longitudinal direction. On the other hand, the lower plate 138 of the lower diaphragm is likewise formed of three slots 140A, 140B and 140C in parallel in a longitudinal direction and corresponding in their size and form to the slots 139A, 139B and 139C, respectively, of the upper plate 137. The second buffer gas chamber 126 has a fuel exhaust gas outlet 141 and a fuel exhaust gas inlet 142. That is, the lower diaphragm 127B is formed of the fuel exhaust gas outlet 141 and the fuel exhaust gas inlet 142 in its front and back outer walls 143 and 144, respectively.

The stack reaction chamber 123 is defined between the upper and lower diaphragms 127A and 127B. The stack reaction chamber 123 has a fuel gas inlet 145 and a fuel exhaust gas outlet 146 in its front and back walls 147 and 148, respectively.

The fuel exhaust gas from the fuel exhaust gas outlet 146 may be introduced into the first and second buffer gas chambers 125 and 126 through a known external means for feeding fuel exhaust gas, such as a pipe (not shown).

Each electrode/solid electrolyte/separator assembly 116 is inserted in a series of slots vertically arranged, i.e., the slots 132A, 133A, 139A and 140A, 132B, 133B, 139B and 140B, or 132C, 133C, 139C and 140C. Each electrode/solid electrolyte/separator assembly (hereafter, ESS assembly for short) 116 hangs on the stack casing 113 by means of a protrusion or fixing part 124 provided on the top of the assembly 116 for hanging the cell substrate.

As will be apparent from FIGS. 5 to 9, the ESS assembly 116 includes a cell substrate 116A, a solid electrolyte 116B, an anode 116C, and a separator 116D. The cell substrate 116A is a flat box-shaped solid member in which there extends a plurality of oxidant gas flow ports 118 in parallel to a main surface of the cell substrate, i.e., in a vertical direction in FIG. 5, and in parallel to each other. The separator 116D is densely superimposed on one main surface 149 of the flat box 116A. No covering layer is formed on side surfaces 150 and 151 of the cell substrate 116A where the oxidant gas flow ports 118 open. The solid electrolyte 116B is densely superimposed on the other main surface 152 of the cell substrate 116A (i.e., on a surface other than the above-mentioned main surface 149 and the side surfaces 150 and 151). On the opposite surface of the solid electrolyte 116B is provided the anode 116C.

In the stack reaction chamber 123, a collector 122 is provided on each inner wall of the chamber that is parallel to the main surface of the cell substrate 116A. A felt 117 is interposed between the anode 116C and the collector 122 and between the anode 116C and the separator 116D. The felt 117, which is a porous body made of nickel, achieves an electrical connection between the ESS assemblies 116. Fuel gas flows in the cavities of the porous body.

Oxidant gas is fed through the oxidant gas inlet manifold 111 to be ESS assemblies. The oxidant gas flows through the oxidant gas flow ports 118 to exhaust through the oxidant gas exhaust manifold 112.

Fuel exhaust gas flows in the first and second buffer gas chambers 125 and 126. The pressures in the first and second buffer gas chambers 125 and 126 are set to pressures lower than the pressures of the oxidant gas and the fuel gas by a known means for adjusting the pressure of a gas (not shown). Oxidant gas, oxidant exhaust gas, fuel gas and fuel exhaust gas pass through the cavity between the ESS assemblies 116 and the diaphragms 127A and 127B of the stack casing 113 and flow into the first and second buffer gas chambers 125 and 126 and, hence, changes in composition of the oxidant gas and fuel gas can be prevented without sealing. Since the ESS assemblies 116 are hung by means of the cell substrate fixing part 124, they can freely expand or contract so that a thermally stable solid electrolyte fuel cell can be obtained.

The oxidant gas flow ports 118 in the ESS assembly extend through the cell substrate 116A. The cell substrate 116A can be made relatively thin to reduce the inner resistance thereof. Oxidant gas flows in the oxidant gas flow ports 118 unidirectionally and, hence, the thermal gradient of the ESS assembly 116 in the direction in which the oxidant gas flows can be reduced so that a solid electrolyte fuel cell which is relatively stable against the heat cycle is obtained.

The gas which is fed in the first and second buffer gas chambers 125 and 126 is not limited to fuel exhaust gas but various gases such as nitrogen gas, rare gas, or steam may also be used.

The pressure of the gas in the first and second buffer gas chambers may be set higher than the pressure of the oxidant gas or the fuel gas by the known external means (not shown). The ESS assemblies 116 may be inserted in the stack casing 113 horizontally instead of in a vertical arrangement.

The gap between the ESS assembly 116 and the diaphragm 127A or 127B of the stack casing 113 may be filled with ceramic fiber (not shown). This allows the first and second buffer gas chambers to be effectively isolated from the stack reaction chamber.

The diaphragms 127A and 127B may be prepared with a ceramic such as alumina, zirconia, or the like.

The stack casing 113, the oxidant gas inlet manifold 111, and the oxidant gas exhaust manifold 112 may be made of a heat-resistant metal, ceramic or composite materials made of these materials. Suitable examples of the heat-resistance metal include ferrite stainless steel, Inconel 600, etc. Examples of the ceramic include alumina, zirconia, etc.

The cell substrate 116A of the ESS assembly 116 can be prepared by extrusion molding a lanthanum perovskite complex oxide such as lanthanum manganite ($LaMnO_3$) or lanthanum chromite ($LaCrO_3$) and calcining the molded material. The solid electrolyte 116B can be superimposed or deposited to a thickness of 150 to 200 μm on the cell substrate by plasma spraying, for example, yttria-stabilized zirconia (YSZ) having a particle diameter of 30 to 50 μm at atmospheric pressure or under reduced pressure. The separator 116D can be superimposed or deposited by plasma spraying or method to a thickness of 150 to 200 μm using lanthanum calcium chromite ($La(Ca)CrO_3$) or lanthanum strontium chromite ($La(Sr)CrO_3$).

The anode 116C may be prepared by mixing nickel oxide (NiO) powder and zirconia ($ZrO_2$) powder so that NiO occupies 40 to 45 volume %, adding a binder and a solvent to the mixture to form a slurry, coating the slurry on the solid electrolyte 116B, drying the slurry, and calcining the dry slurry. The felt 117 may be nickel metal, cobalt metal, etc.

The cell substrate 116A may be prepared with lanthanum perovskite complex oxide and serves by itself as a cathode. However, other electrode layers which have a cathode activity may be superimposed on the cell substrate 116A.

The oxidant gas which flows through the oxidant gas flow ports 118 contact the cell substrate 116A and couples with electrons to generate oxygen ions. The oxygen ions disperse in the solid electrolyte 116B into the anode 116C where they react with hydrogen to form water. Electrons liberated from the oxygen ions migrate in the felt 117 and the separator 116D and reach the cell substrate 116A. Water molecules and unreacted hydrogen molecules are discharged as fuel exhaust gas.

As described above, according to the present invention, a planar solid electrolyte fuel cell can be obtained which has an improved flatness of the casing, a relatively short current flow path, and an improved output density. The electrode/solid electrolyte/separator assembly is allowed to freely expand or contract thermally and can be made to have a relatively small temperature gradient so that there can be obtained a solid electrolyte fuel cell also having an improved thermal stability.

The present invention has been described in detail with respect to preferred embodiments, however, changes and modifications may be made without departing from the invention in its broader aspects. It is the intention, therefore, in the appended claims to cover all such changes and modifications as fall within the true spirit of the invention.

What is claimed is:

1. A planar solid electrolyte fuel cell comprising:

a stack casing having a stack reaction chamber therein;

a plurality of vertically oriented electrode/solid electrolyte/separator assemblies arranged in a parallel orientation in the stack reaction chamber of said stack casing, each of said assemblies comprising:

a cell substrate serving as a first electrode, said cell substrate being a flat box with first and second, oppositely located vertical main surfaces during operation of the fuel cell, and including a plurality of reaction gas flow ports located therein, said gas flow ports being parallel to the main surfaces, and feeding a first reactant gas in a uniform direction, a solid electrolyte provided on the first main surface of said cell substrate, a second electrode provided on said solid electrolyte, and a separator provided on the second main surface of said cell substrate; and an electroconductive felt interposed between adjacent ones of said assemblies, said electroconductive felt having a plurality of cavities through which a second gas flows.

2. The fuel cell as claimed in clam 1, further comprising an inlet manifold provided on an outer surface of said stack casing for feeding the first reactant gas, and an outlet manifold provided on an opposite outer surface of said stack casing for exhausting the first reactant gas.

3. The fuel cell as claimed in claim 2, wherein said stack casing further comprises first and second buffer gas chambers sandwiching said stack reaction chamber therebetween and communicating with said inlet and outlet manifolds, whereby buffer gas flows in said buffer gas chambers, said chambers being provided with slots through which said electrode/solid electrolyte/separator assemblies are inserted.

4. The fuel cell as claimed in claim 3, wherein said buffer gas is fuel exhaust gas.

5. The fuel cell as claimed in claim 3, wherein said buffer gas is selected from the group consisting of nitrogen gas, rare gas, and steam.

6. The fuel cell as claimed in claim 3, wherein said buffer gas is at a pressure lower than the first reactant gas and the second gases.

7. The fuel cell as claimed in claim 3, wherein said buffer gas chambers are made of a ceramic.

8. The fuel cell as claimed in claim 1, wherein each of said electrode/solid electrolyte/separator assemblies hangs on said stack casing.

9. The fuel cell as claimed in claim 1, wherein said stack casing consists of a heat-resistant metal, a ceramic or a composite material thereof.

10. The fuel cell as claimed in claim 9, wherein said heat-resistant metal is a ferrite stainless steel or "a nickel-chromium alloy" in its place.

11. The fuel cell as claimed in claim 9, wherein said ceramic is alumina or zirconia.

12. The fuel cell as claimed in claim 1, wherein said cell substrate is made of a lanthanum perovskite complex oxide.

13. The fuel cell as claimed in claim 12, wherein said lanthanum perovskite complex oxide is lanthanum manganite or lanthanum chromite.

14. The fuel cell as claimed in claim 1, wherein said electroconductive felt is nickel metal or cobalt metal.

15. The fuel cell as claimed in claim 1, wherein said separator is made of lanthanum chromite.

16. The fuel cell as claimed in claim 1, wherein said electrode/solid electrolyte/separator assembly further comprises a separate first electrode.

17. A planar solid electrolyte fuel cell comprising:

a stack casing having first and second oppositely located outer surfaces, a stack reaction chamber located therein, and first and second buffer gas chambers having a buffer gas flowing therein, said buffer gas chambers sandwiching said stack reaction chamber therebetween, each of said buffer gas chambers being provided with a plurality of slots;

a plurality of electrode/solid electrolyte/separator assemblies inserted through the respective slots of said buffer gas chambers and being connected in parallel and located in the stack reaction chamber of said stack casing, each of said assemblies comprising:

a cell substrate serving as a first electrode, said cell substrate being a flat box with first and second, oppositely located main surfaces, and including a plurality of reaction gas flow ports located therein, said gas flow ports being parallel to the main surfaces and feeding a first reactant gas in a uniform direction, a solid electrolyte provided on the first main surface of said cell substrate, a second electrode provided on said solid electrolyte, and a separator provided on the second main surface of said cell substrate;

an inlet manifold provided on the first outer surface of said stack casing for feeding the first reactant gas;

an outlet manifold provided on the second outer surface of said stack casing for exhausting the first reactant gas, said inlet manifold and said exhaust manifold being in communication with said first and second buffer gas chambers; and an electroconductive felt interposed between adjacent ones of said assemblies, said electroconductive felt having a plurality of cavities through which a second gas flows.

18. A planar solid electrolyte fuel cell comprising:

a stack casing having a stack reaction chamber therein;

a plurality of electrode/solid electrolyte/separator assemblies connected in parallel and located in the stack reaction chamber of said stack casing, each of said assembles hanging on said stack casing, each of said assemblies comprising:

a cell substrate serving as a first electrode, said cell substrate being a flat box with first and second, oppositely located main surfaces, and including a plurality of reaction gas flow ports located therein, said gas flow ports being parallel to the main surfaces and feeding a first reactant gas in a uniform direction, a solid electrolyte provided on the first main surface of said cell substrate, a second electrode provided on said solid electrolyte, and a separator provided on the second main surface of said cell substrate; and an electroconductive felt interposed between adjacent ones of said assemblies, said electroconductive felt having a plurality of cavities through which a second gas flows.

19. A planar solid electrolyte fuel cell comprising:

a stack casing having a stack reaction chamber therein, said stack casing consisting of a heat-resistant metal, a ceramic or a composite material thereof;

a plurality of electrode/solid electrolyte/separator assemblies connected in parallel and located in the stack reaction chamber of said stack casing, each of said assemblies comprising:

a cell substrate serving as a first electrode, said cell substrate being a flat box with first and second, oppositely located main surfaces, and including a plurality of reaction gas flow ports located therein, said gas flow ports being parallel to the main surfaces and feeding a first reactant gas in a uniform direction, a solid electrolyte provided on the first main surface of said cell substrate, a second electrode provided on said solid electrolyte, and a separator provided on the second main surface of said cell substrate; and an electroconductive felt interposed between adjacent ones of said assemblies, said electroconductive felt having a plurality of cavities through which a second gas flows.

20. A planar solid electrolyte fuel cell comprising:

a stack casing having a stack reaction chamber therein;

a plurality of electrode/solid electrolyte/separator assemblies connected in parallel and located in the stack reaction chamber of said stack casing, each of said assemblies comprising:

a cell substrate serving as a first electrode, said cell substrate being composed of a lanthanum perovskite complex oxide, said cell substrate being a flat box with first and second, oppositely located main surfaces, and including a plurality of reaction gas flow ports located therein, said gas flow ports being parallel to the main surfaces and feeding a first reactant gas in a uniform direction, a solid electrolyte provided on the first main surface of said cell substrate, a second electrode provided on said solid electrolyte, and a separator provided on the second main surface of said cell substrate; and an electroconductive felt interposed between adjacent ones of said assemblies, said electroconductive felt having a plurality of cavities through which a second gas flows.

21. A planar solid electrolyte fuel cell comprising:

a stack casing having a stack reaction chamber therein;

a plurality of electrode/solid electrolyte/separator assemblies connected in parallel and located in the stack reaction chamber of said stack casing, each of said assemblies comprising:

a cell substrate serving as a first electrode, said cell substrate being a flat box with first and second, oppositely located main surfaces, and including a plurality of reaction gas flow ports located therein, said gas flow ports being parallel to the main surfaces and feeding a first reactant gas in a uniform direction, a solid electrolyte provided on the first main surface of said cell substrate, a second electrode provided on said solid electrolyte, and a separator provided on the second main surface of said cell substrate; and an electroconductive felt comprised of nickel metal or cobalt metal, and being interposed between adjacent ones of said assemblies, said electroconductive felt having a plurality of cavities through which a second gas flows.

22. A planar solid electrolyte fuel cell comprising:

a stack casing having a stack reaction chamber therein;

a plurality of electrode/solid electrolyte/separator assemblies connected in parallel and located in the stack reaction chamber of said stack casing, each of said assemblies comprising:

a cell substrate serving as a first electrode, said cell substrate being a flat box with first and second, oppositely located main surfaces, and including a plurality of reaction gas flow ports located therein, said gas flow ports being parallel to the main surfaces and feeding a first reactant gas in a uniform direction a solid electrolyte provided on the first main surface of said cell substrate, a second electrode provided on said solid electrolyte, and a separator comprised of lanthanum chromite and being provided on the second main surface of said cell substrate; and an electroconductive felt interposed between adjacent ones of said assemblies, said electroconductive felt having a plurality of cavities through which a second gas flows.

23. A planar solid electrolyte fuel cell comprising:

a stack casing having a stack reaction chamber therein;

a plurality of electrode/solid electrolyte/separator assemblies connected in parallel and located in the stack reaction chamber of said stack casing, each of said assemblies comprising:

a cell substrate serving as a first electrode, said cell substrate being a flat box with first and second, oppositely located main surfaces, and including a plurality of reaction gas flow ports located therein, said gas flow ports being parallel to the main surfaces and feeding a first reactant gas in a uniform direction, a separate electrode superimposed on said cell substrate, a solid electrolyte provided on the first main surface of said cell substrate, a second electrode provided on said solid electrolyte, and a separator provided on the second main surface of said cell substrate; and an electroconductive felt interposed between adjacent ones of said assemblies, said electroconductive felt having a plurality of cavities through which a second gas flows.

24. The fuel cell as claimed in clam 18, wherein said stack casing has first and second oppositely located outer surfaces; further comprising an inlet manifold provided on the first outer surface of said stack casing for feeding the first reactant gas, and an outlet manifold provided on the second outer surface of said stack casing for exhausting the first reactant gas.

25. The fuel cell as claimed in claim 24, wherein said stack casing further comprises first and second buffer gas chambers sandwiching said stack reaction chamber therebetween and communicating with said inlet and outlet manifolds, whereby buffer gas flows in said buffer gas chambers, said chambers being provided with slots through which said electrode/solid electrolyte/separator assemblies are inserted.

26. The fuel cell as claimed in claim 25, wherein said buffer gas is fuel exhaust gas.

27. The fuel cell as claimed in claim 25, wherein said buffer gas is selected from the group consisting of nitrogen gas, rare gas, and steam.

28. The fuel cell as claimed in claim 25, wherein said buffer gas is at a pressure lower than the first reactant gas and the second gas.

29. The fuel cell as claimed in claim 25, wherein said buffer gas chambers are made of a ceramic.

30. The fuel cell as claimed in claim 18, wherein said stack casing consists of a heat-resistant metal, a ceramic or a composite material thereof.

31. The fuel cell as claimed in claim 30, wherein said heat-resistant metal is a ferrite stainless steel or Inconel 600.

32. The fuel cell as claimed in claim 30, wherein said ceramic is alumina or zirconia.

33. The fuel cell as claimed in claim 18, wherein said cell substrate is made of a lanthanum perovskite complex oxide.

34. The fuel cell as claimed in claim 33, wherein said lanthanum perovskite complex oxide is lanthanum manganite or lanthanum chromite.

35. The fuel cell as claimed in claim 18, wherein said electroconductive felt is nickel metal or cobalt metal.

36. The fuel cell as claimed in claim 18, wherein said separator is made of lanthanum chromite.

37. The fuel cell as claimed in claim 18, wherein said electrode/solid electrolyte/separator assembly further comprises a separate first electrode.

* * * * *